United States Patent
Wu et al.

(10) Patent No.: US 9,235,530 B2
(45) Date of Patent: Jan. 12, 2016

(54) METHOD AND SYSTEM FOR BINARY CACHE CLEANUP

(75) Inventors: William Wu, Cupertino, CA (US); Steven Sprouse, San Jose, CA (US); Sergei Anatolievich Gorobets, Edinburgh (GB); Alan Bennett, Edinburgh (GB); Ameen Aslam, Santa Clara, CA (US)

(73) Assignee: SanDisk Technologies Inc., Plano, TX (US)

( * ) Notice: Subject to any disclaimer, the term of this patent is extended or adjusted under 35 U.S.C. 154(b) by 585 days.

(21) Appl. No.: 12/790,960

(22) Filed: May 31, 2010

(65) Prior Publication Data

US 2011/0296122 A1    Dec. 1, 2011

(51) Int. Cl.
*G06F 12/12* (2006.01)
*G06F 12/08* (2006.01)

(52) U.S. Cl.
CPC .......... *G06F 12/121* (2013.01); *G06F 12/0804* (2013.01); *G06F 12/0866* (2013.01)

(58) Field of Classification Search
CPC . G06F 21/121; G06F 12/0811; G06F 12/126; G06F 12/122; G06F 12/123; G06F 12/128
See application file for complete search history.

(56) References Cited

U.S. PATENT DOCUMENTS

| | | | |
|---|---|---|---|
| 5,930,167 A | 7/1999 | Lee et al. | |
| 5,937,425 A | 8/1999 | Ban | |
| 6,502,110 B1 * | 12/2002 | Houldsworth | |
| 6,678,785 B2 | 1/2004 | Lasser | |
| 7,076,611 B2 | 7/2006 | Steere et al. | |
| 2002/0073283 A1 * | 6/2002 | Lewis et al. | 711/133 |
| 2005/0138289 A1 * | 6/2005 | Royer et al. | 711/118 |
| 2006/0064549 A1 * | 3/2006 | Wintergerst | 711/134 |
| 2006/0143389 A1 | 6/2006 | Kilian et al. | |
| 2007/0061502 A1 | 3/2007 | Lasser et al. | |
| 2008/0120469 A1 * | 5/2008 | Kornegay et al. | 711/133 |
| 2008/0209131 A1 | 8/2008 | Kornegay et al. | |

FOREIGN PATENT DOCUMENTS

| | | |
|---|---|---|
| WO | WO 02/35360 A2 | 5/2002 |
| WO | WO 2010/045330 A1 | 4/2010 |

OTHER PUBLICATIONS

International Search Report and Written Opinion from corresponding PCT Appln. No. PCT/US2011/038304 dated Oct. 21, 2011 (11 pgs).
U.S. Appl. No. 12/348,895 to Paley et al.

* cited by examiner

*Primary Examiner* — Hal Schnee
*Assistant Examiner* — Alan Otto
(74) *Attorney, Agent, or Firm* — Brinks Gilson & Lione

(57) ABSTRACT

A system and method for clearing data from a cache in a storage device is disclosed. The method may include analyzing the cache for the least recently fragmented logical group, and evicting the entries from the least recently fragmented logical group. Or, the method may also include analyzing compaction history and selecting entries for eviction based on the analysis of the compaction history. The method may also include scheduling of different eviction mechanisms during various operations of the storage device. The system may include a cache storage, a main storage and a controller configured to evict entries associated with a least recently fragmented logical group, configured to evict entries based on analysis of compaction history, or configured to schedule different eviction mechanisms during various operations of the storage device.

28 Claims, 12 Drawing Sheets

| Name | Description |
|---|---|
| Logical Group number | Logical Group that this fragment belongs to. |
| Sector offset in LG | Sector in LG that this fragment belongs to. |
| Length | Length of the fragment in sectors. |
| UbOverwirteFlags | Markers to determine if fragment overwrites Update Block |

Partial Description of Fragment header

FIG. 5

| Name | | Description |
|---|---|---|
| LgInfo (variable size up to 64 entries) | | Logical group id, start sector, size (in sectors) of a fragment. |
| BCIDirectory (fixed size, @ the end of an ECC Page) | BcBlocks[32] | Logical group id, start sector, size (in sectors) of a fragment. |
| | BciDirector[128] | Location of all valid BCI records and start LG for each record. |

Partial Description of BCI

FIG. 6

METHOD AND SYSTEM FOR BINARY CACHE CLEANUP

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device.

Some flash memory management systems employ self-caching architectures where data received from a host is first stored in a portion of the flash memory designated as the cache and is later copied to a portion of the flash memory designated as a main storage area (such as a multi-level cell (MLC) type flash memory). In this type of flash memory management system, there is the question of when to schedule cache eviction operations. In cache eviction operations, a portion of the data in the cache, typically data corresponding to a common logical block, is copied from the cache to the main storage area and then removed from the cache to make room for new input data in the cache.

Self-caching flash memory management systems may employ different policies regarding the scheduling of cache eviction operations and regarding the selection of the specific data to be evicted. Typically, the factors influencing the scheduling decisions are how full the cache is, and whether there are access requests arriving from the host that have to be serviced. When the storage system is idle with respect to host requests, the flash memory management system may evict all data in the cache so that the cache is better prepared for a possible future burst of host activity.

Further, a current binary cache eviction algorithm attempts to provide the best gain in obsolete space by evicting: (1) the logical group (LG) with the highest number of fragments in the binary cache (BC) during a host operation (when the binary cache utilization threshold is exceeded); and (2) the logical group with the number of fragments exceeding a calculated threshold during idle time (when the idle time binary cache utilization threshold is exceeded).

The referenced current binary cache eviction algorithm may fail to select the logical groups best suited for eviction. This results in a reduction in the usable capacity, which may be defined as the maximum binary cache capacity minus the binary cache utilization threshold for logical group eviction. It further results in a higher frequency of binary cache evictions to the MLC (causing lower performance and reducing MLC endurance), and in a higher frequency of binary cache compactions and more data to copy (causing lower performance and reducing binary cache endurance). What is needed is a binary cache eviction operation that better selects entries in the binary cache for eviction.

SUMMARY

In order to address the problems noted above, a method and system for binary cache cleanup is disclosed. The method and system include eviction mechanisms for binary cache cleanup and include scheduling schemes for the eviction mechanisms.

According to a first aspect of the invention, an eviction method is disclosed that manages movement of data from a cache storage to a main storage is disclosed. The cache storage storing a plurality of data associated with respective logical space indicators. The method includes analyzing for a predetermined criterion less than all of the plurality of data stored in the cache that are associated with the respective logical space indicators. The method also includes selecting a logical space indicator, from the respective logical space indicators, associated with a portion of data satisfying the predetermined criterion (such as selecting a logical group that has a fragment that is the oldest in part or all of the binary cache). Further, the method includes evicting at least some of the data in the cache storage that is associated with the selected logical space indicator (such as some or all of the data that are associated with the selected logical group).

In another aspect of the invention, an eviction method of evicting data from a cache storage to a main storage in a storage device is disclosed that analyzes compaction. The method includes analyzing at least a part of the cache storage for compaction history, and evicting at least some of the data in the cache storage based on the analysis.

According to another aspect of the invention, an eviction method of evicting data from a cache storage to a main storage in a storage device is disclosed that uses multiple eviction mechanisms during at least one phase of operation of the storage device. The method includes determining a phase of operation of the storage device, selecting multiple cache eviction mechanisms in response to determining the phase of operation of the storage device, and performing the multiple cache eviction mechanism during the phase of operation of the storage device.

In other aspects of the invention, a processor readable medium is disclosed having processor executable instructions for carrying out the above-described methods.

In yet another aspect of the invention, a storage device is disclosed that includes a cache storage configured for receiving data associated with host write commands and a main storage in communication with the cache storage that is configured to receive data transferred from the cache storage. A controller in the storage device is arranged to manage transfer of the data associated with host write commands from the cache storage to the main storage. The controller is configured to analyze for a predetermined criterion less than all of the plurality of data stored in the cache that are associated with the respective logical space indicators, select a logical space indicator, from the respective logical space indicators, associated with a portion of data satisfying the predetermined criterion, and evict at least some of the data in the cache storage that is associated with the selected logical space indicator.

In another aspect of the invention, a storage device includes a cache storage configured for receiving data associated with host write commands and a main storage in communication with the cache storage for receiving data transferred from the cache storage. The storage device also includes a controller configured to analyze at least a part of the cache storage for compaction history, and evict at least some of the data in the cache storage based on the analysis.

In still another aspect of the invention, a storage device includes a cache storage configured for receiving data associated with host write commands and a main storage in communication with the cache storage for receiving data transferred from the cache storage. The storage device also includes a controller configured to determine a phase of operation of the storage device, select multiple cache eviction mechanisms in response to determining the phase of operation of the storage device, and perform the multiple cache eviction mechanism during the phase of operation of the storage device.

BRIEF DESCRIPTION OF THE DRAWINGS

FIG. 5 is a table showing partial description of the fragment header.

FIG. 6 is a table showing partial description of binary cache index.

BRIEF DESCRIPTION OF THE PRESENTLY PREFERRED EMBODIMENTS

Figure 1:
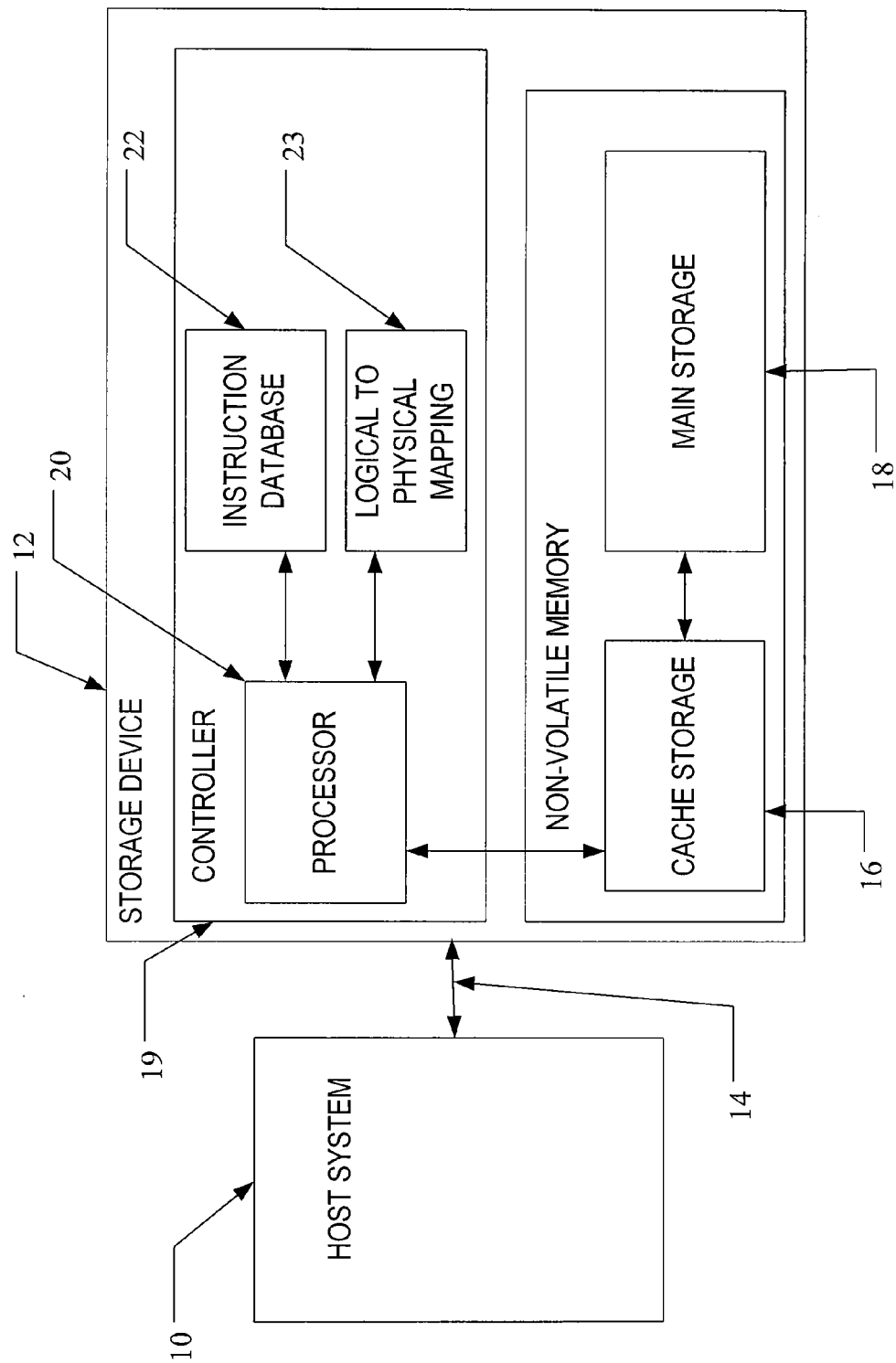
FIG. 1 is a block diagram of a self-caching memory system.

A flash memory system suitable for use in implementing aspects of the invention is shown in FIG. 1. A host system 10 stores data into, and retrieves data from, a self-caching flash storage device 12. The storage device 12 may be embedded in the host or may exist in the form of a card or other removable drive that is removably connected to the host 10 through a mechanical and electrical connector. The host 10 may be any of a number of data generating devices, such as a personal computer, a mobile telephone, a personal digital assistant (PDA), or the like. The host 10 communicates with the storage device over a communication channel 14.

The storage device 12 contains non-volatile memory cells that are arranged as cache storage 16 and main storage 18. The cache storage 16 and main storage 18 may be made up of the same type of flash memory cell configured to operate in different modes or different types of flash memory cells. For example, the cache storage 16 may be configured in a single level cell (SLC) type of flash configuration (e.g., binary cache) while the main storage 18 may comprise a multi-level cell (MLC) type flash memory configuration to take advantage of the higher write speed of SLC flash and the higher density of MLC flash. Different combinations of flash memory types are also contemplated for the cache storage 16 and main storage 18. The storage device 12 also includes a controller 19 that may include a processor 20, instructions 22 for operating the processor 20 and one or more tables (such as a logical block to physical block translation table 23). Examples of suitable self-caching flash memory configurations that may be adapted to implement the cache eviction policies described herein are disclosed in U.S. Pat. No. 5,930,167 to Lee et al.; in U.S. application Ser. No. 11/318,906 to Lasser et al.; and in U.S. application Ser. No. 12/348,895 to Paley et al., each of which are incorporated herein by reference in their entirety.

The cache storage 16 and main storage 18 may be described in physical and logical terms. For example, the cache storage 16 and main storage 18 may be described physically as a non-volatile flash memory arranged in blocks of memory cells, as discussed above. A block of memory cells is the unit of erase, i.e., the smallest number of memory cells that are physically erasable together. For increased parallelism, however, the blocks may be operated in larger metablock units. One block from each plane of memory cells may be logically linked together to form a metablock, which may be another physical description of a part of the flash memory. In a storage device where the cache storage 16 is in an SLC configuration and the main storage 18 is in an MLC configuration, a metablock arrangement is useful because multiple cache blocks may be needed to store an amount of data equal to one main storage block.

Figure 2:
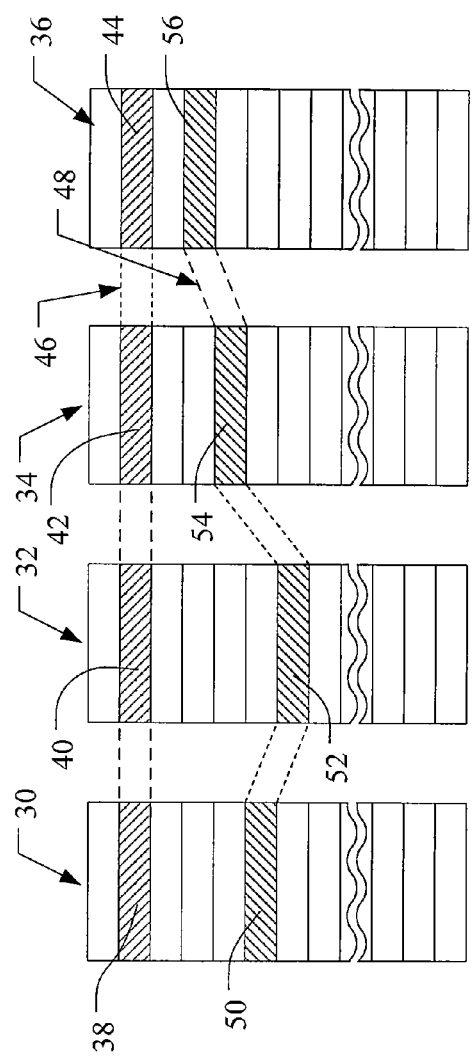
FIG. 2 illustrates an example physical memory organization of the system of FIG. 1.

Referring to FIG. 2, a conceptual illustration of a representative flash memory cell array is shown. Four planes or sub-arrays 30, 32, 34 and 36 memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 38, 40, 42 and 44, located in respective planes 30, 32, 34 and 36. There may be dozens or hundreds of blocks in each plane. Blocks may be logically linked together to form a metablock that may be erased as a single unit. For example, blocks 38, 40, 42 and 44 may form a first metablock 46. The blocks used to form a metablock need not be restricted to the same relative locations within their respective planes, as is shown in the second metablock 48 made up of blocks 50, 52, 54 and 56.

Figure 3:
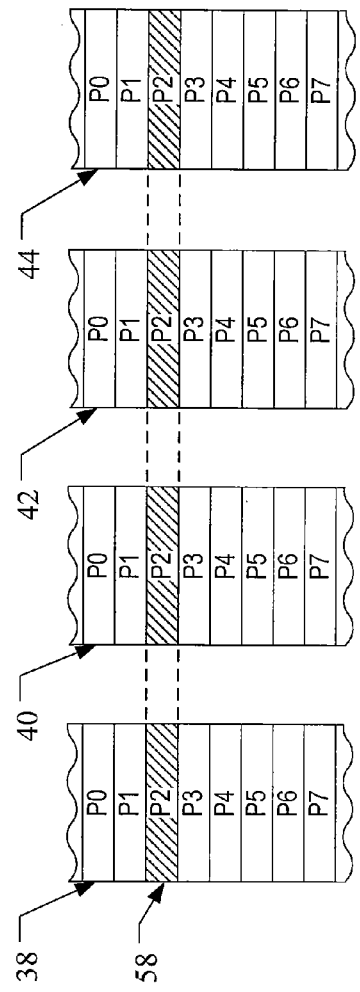
FIG. 3 shows an expanded view of a portion of the physical memory of FIG. 2.

The individual blocks are in turn divided for operational purposes into pages of memory cells, as illustrated in FIG. 3. The memory cells of each of blocks 38, 40, 42, and 44, for example, are divided into eight pages P0-P7. Alternately, there may be 16, 32 or more pages of memory cells within each block. A Page is the unit of data programming (writing) and reading within a block, containing the minimum amount of data that are programmed (written) or read at one time. A metapage 58 is illustrated in FIG. 3 as formed of one physical page for each of the four blocks 38, 40, 42 and 44. The metapage 58 includes the page P2 in each of the four blocks but the pages of a metapage need not necessarily have the same relative position within each of the blocks. A metapage may be the maximum unit of programming. The blocks disclosed in FIGS. 2-3 are referred to herein as Physical Blocks because they relate to groups of physical memory cells as discussed above.

The flash memory may further be described in logical terms, as discussed above. One such term is a logical block, which is a virtual unit of address space defined to have the same size as a physical block. A logical block is typically 512 Bytes of host data identified by a logical block address (LBA) within a logical partition. Each logical block includes a range of logical block addresses (LBAs) that are associated with data received from a host 10. The LBAs are then mapped to one or more Physical Blocks in the storage device 12 where the data is physically stored. A logical group is the group of contiguous logical blocks which maps to one metablock. Capacity of logical group depends on metablock's type. A logical group corresponds to a same capacity group of logical blocks, which may or may not be logically contiguous in LBA space of a partition. Yet another logical term for the flash memory includes a logical megagroup, which is the group of contiguous logical sectors which maps to multiple metablocks. Capacity of a logical megagroup depends on metablock's type.

Figure 4:
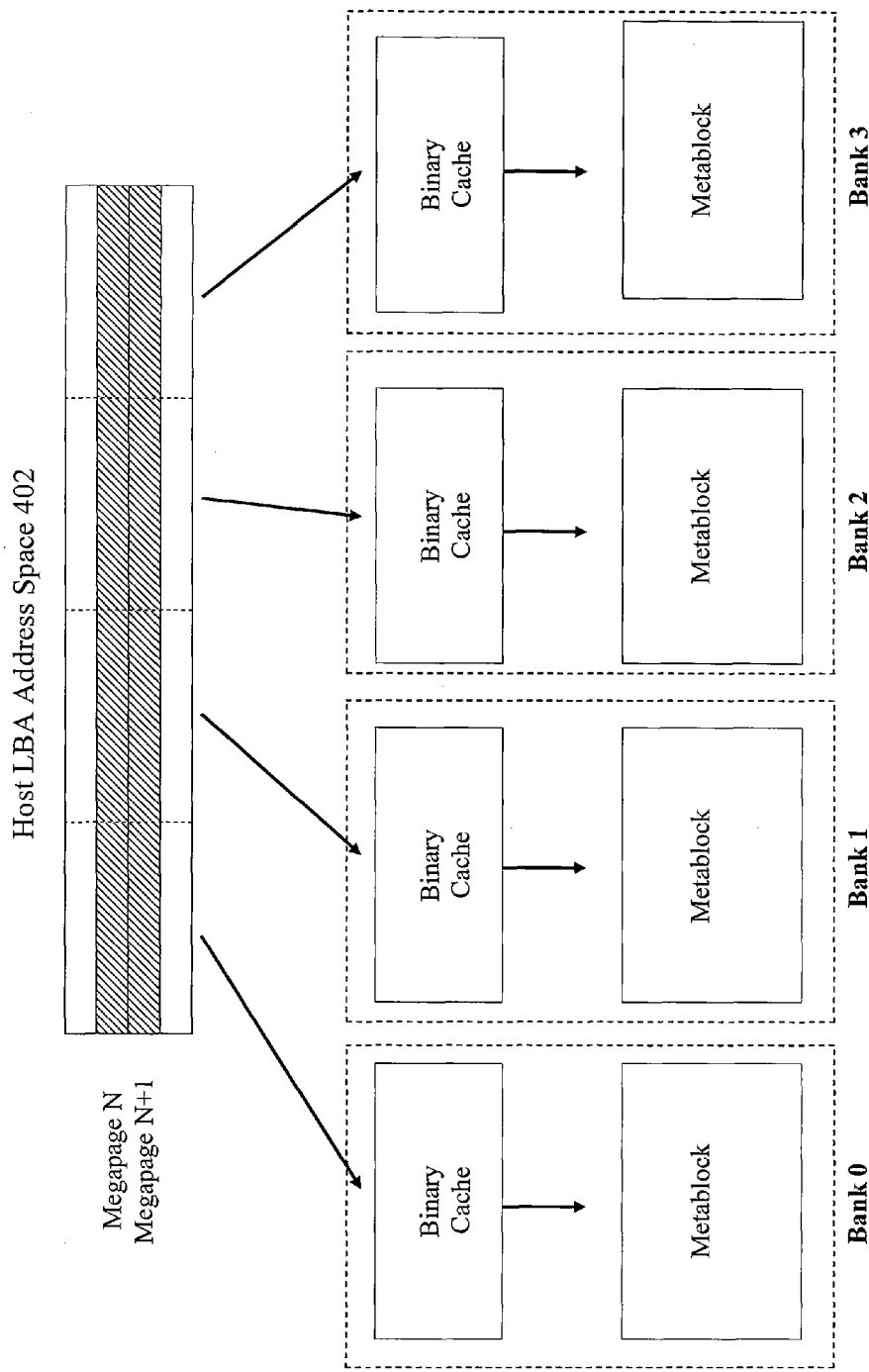
FIG. 4 illustrates the metablocks in each bank being partitioned into a binary cache portion and a regular metablock portion.

FIG. 4 illustrates the metablocks in each bank being partitioned into a binary cache portion and a regular metablock portion. The binary cache portion has the memory storing binary data, whereas the regular metablock portion is configured as MLC memory that can store one or more bits of data per cell. FIG. 4 also illustrates the mapping of addresses in host LBA address space 402 to banks in a 4-bank memory. Metapages N and N+1 interleave across 4 banks, completely independent from each other. The memory arrays in each bank may be organized into metablocks to which logical groups are mapped.

The LBA address space for binary memory for a single bank comprises sequential LBA addresses within metapages, and sequential metapages within metablocks. For a 4-bank memory, every 4th metapage in host LBA address space is a metapage in the sequential LBA address space for one bank, making bank logical space 4 times smaller. An LBA address for a bank comprises a host LBA address with two relevant bits omitted.

FIG. 5 is a table showing partial description of the fragment header. The fields are logic group number, sector offset in LG, length of the fragment, and UbOverwriteFlags which is a flag to indicate if the fragment overwrites Update Block.

Figure 7:
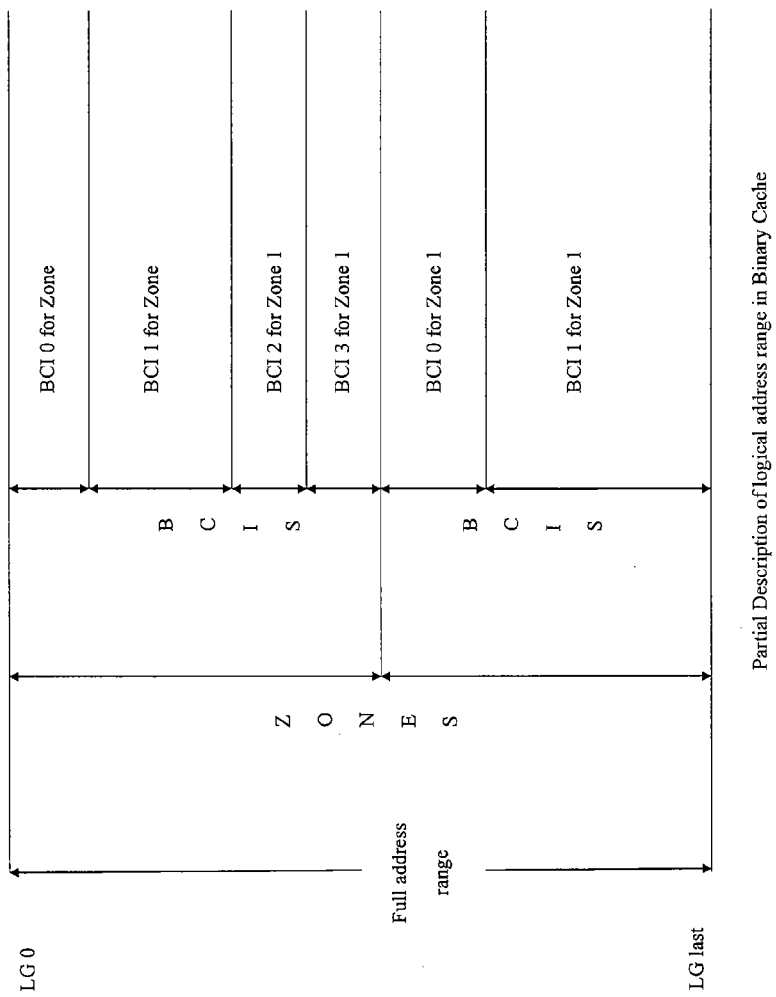
FIG. 7 illustrates the logical address range in the binary cache.

FIG. 6 is a table showing partial description of binary cache index (BCI). Further, FIG. 7 illustrates the logical address range in the binary cache. BCI records are used to aid rapid indexing of fragments. Each BCI record stores information about fragments belonging to a range of logical groups. A BCI record may have a fixed size and may fit inside a single Error Correcting Code (ECC) Page. If there is not enough free space inside the BCI record to store additional fragment descriptions, the BCI may be split into 2 BCIs. Each BCI record may reference a discrete range of logical groups (and their fragments). Each BCI may further cover a non overlapping section of the possible logical group range.

As discussed in more detail below, the one or more eviction mechanisms may access information similar to that presented in FIGS. 5-6 (such as the binary cache index) in order to determine whether to evict one or more entries from the binary cache. The binary cache index can store directory information about fragments belonging to a range of logical groups. To control the size of a BCI, the logical address range may be divided into a number of sections or "zones". And, each zone can be an independent entity, and can manage its own logical address range. Each zone may be further subdivided into multiple binary cache blocks (with the binary cache blocks include multiple entries, such as multiple fragments in binary cache or multiple lines in binary cache). For example, the cache storage 16 may be divided into four zones, with each zone having 16 or 32 binary cache blocks. However, fewer or greater numbers of zones are contemplated, and fewer or greater numbers of binary cache blocks within the zones are contemplated.

In operation, the cache storage 16 of the storage device 12 will receive data from the host 10 associated with host write commands. The data received at the cache storage 16 is addressed in logical blocks of addresses by the host 10 and, when the data is stored in cache storage 16, the data associated with a given logical block of addresses may be stored in a single physical block in the cache storage 16 or dispersed over multiple different physical blocks in the cache storage 16. The processor 20 tracks the mapping of logical addresses to physical addresses in the logical block to physical block translation table 23. The processor 20 may look at the current cache storage capacity and/or the current operation to determine if the cache eviction mechanism described herein should be initiated based on processor executable instructions in the instructions database 22. When cache storage eviction is warranted based on the current cache capacity and/or based on the current operation of the storage device (such as whether or not there is a host operation, as described below), the processor may examine at logical blocks of data to determine if the portion of the data residing in one or more physical blocks of the cache storage 16 that corresponds to a particular logical block will be copied to the main storage 18. Examples of flash management systems that may be modified to incorporate the host write and cache eviction algorithm disclosed herein may be found in U.S. Pat. No. 5,937,425 to Ban and U.S. Pat. No. 6,678,785 to Lasser, and the entirety of each of these patents is hereby incorporated by reference.

Figure 8:
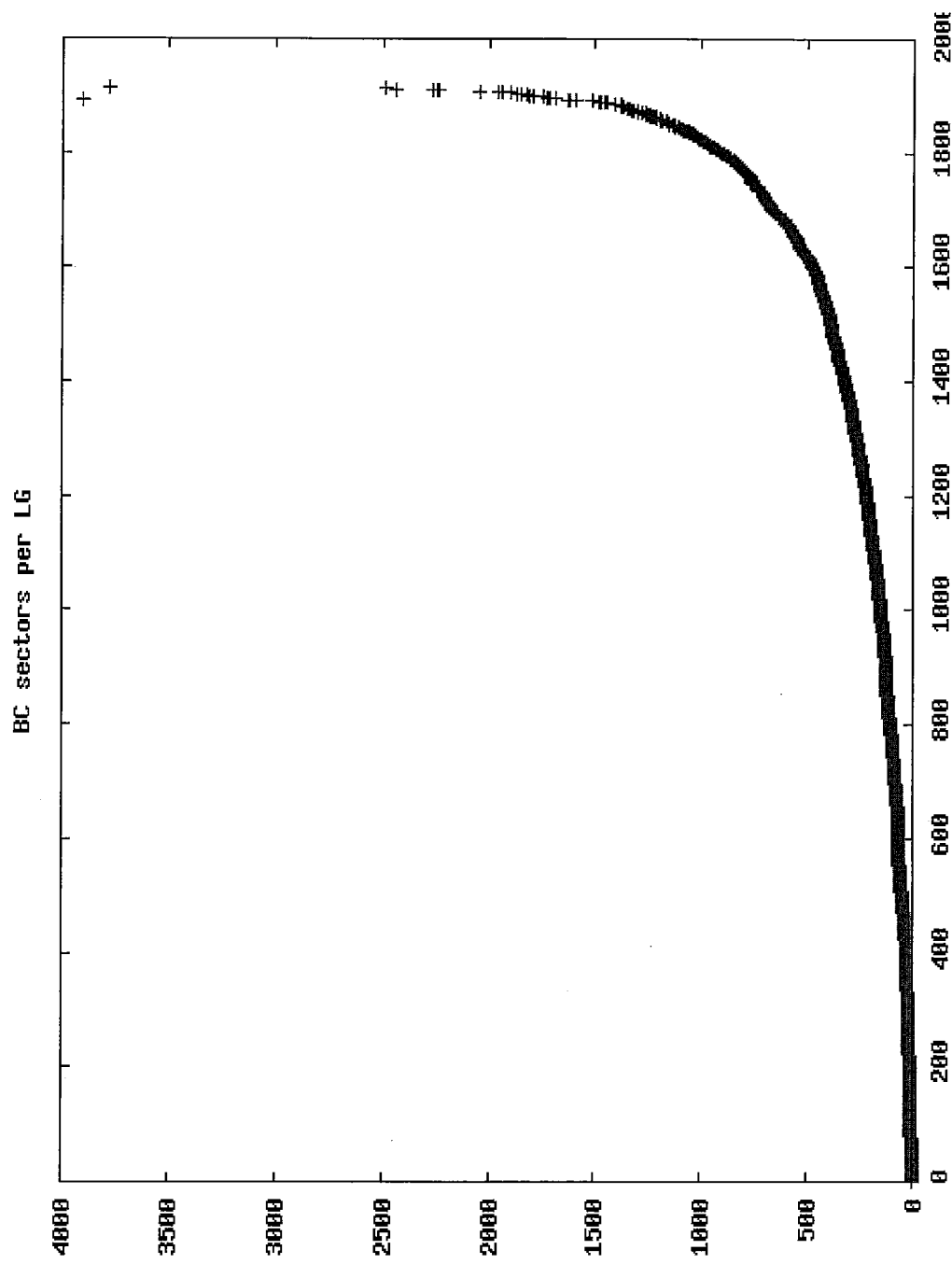
FIG. 8 is a graph illustrating the contents of a binary cache after a period of use.

Since the cache eviction algorithm described in the Background section relies on a calculation of the number of fragments, it may fail to evict logical groups with fewer fragments. These logical groups with fewer fragments become "resident" in the binary cache, reducing the useful capacity of the binary cache over time. FIG. 8 illustrates a snapshot of the contents of a binary cache after a period of use (such as 4 months of usage). The x-axis in FIG. 8 corresponds to logical groups sorted by the number of sectors in the binary cache and the y-axis corresponds to the amount of sectors per logical group on the x-axis. As can be seen from FIG. 8, logical groups with fewer than 1000 sectors likely will never be evicted, limiting the usable capacity by the binary cache utilization threshold, increasing the frequency of binary cache evictions to the MLC and increasing the frequency of binary cache compaction.

The following illustrates improved cache eviction mechanisms and scheduling schemes for implementing the improved cache eviction mechanisms. Generally speaking, a cache eviction mechanism attempts to select the logical groups for eviction based on the following (in order of priority):

1. Logical groups that will not be accessed again (termed "cold data");

2. Logical groups with data that will not be accessed again ("cold data") and with data that will be accessed again (termed "hot data"), so that cold data is removed from the binary cache; and 3. Logical groups with data that will be accessed again ("hot data") but have the most sectors in the binary cache to reduce eviction penalty, resulting in the best gain in obsolete space.

In order to achieve one or more of the above, different types of cache eviction mechanisms are provided. One type of cache eviction mechanism analyzes the binary cache for at least one characteristic independent of any logical space indicator, and selects the entries for eviction based on the analysis.

As discussed above, the flash memory may be described in logical terms, including using a logical block, a logical group, a logical megagroup, etc., each of which may be a logical space indicator. The cache eviction mechanism may analyze the binary cache in physical terms (such as by analyzing binary cache blocks, binary cache zones, etc.) for one or more particular characteristics independent of any logical space indicator, as discussed in more detail in the flow chart depicted in FIG. 9. One type of characteristic is recent use. For example, in one embodiment, a Least Recently Used (LRU) algorithm may analyze binary cache blocks for recent use, and select the binary cache block that has not been used for the longest period of time. As another example, in an alternative embodiment, a Least Recently Used (LRU) algorithm may analyze binary cache zones for recent use, and select the binary cache zone that has not been used for the longest period of time. Another type of characteristic is frequent use. For example, in one embodiment, a Least Frequently Used (LFU) algorithm may analyze binary cache blocks for frequency of use, and select the binary cache block that has been least frequently used. As another example, in an alternative embodiment, a Least Frequently Used (LFU) algorithm may analyze binary cache zones for frequency of use, and select the binary cache zone that has been least frequently used. Other types of characteristics for analysis and other types of algorithms are contemplated.

Once the analysis selects a binary cache block or binary cache zone, the cache eviction mechanism may select a logical space indicator in order to evict entries from the binary cache. For example, a logical group that has one or more entries in the selected binary cache block or binary cache zone may be selected, as discussed in FIG. 9. Thereafter, one, some or all of the entries associated with the selected logical group may be evicted from at least a part of the binary cache (such as from the binary cache block, the binary cache zone, or the entire binary cache).

Figure 9:
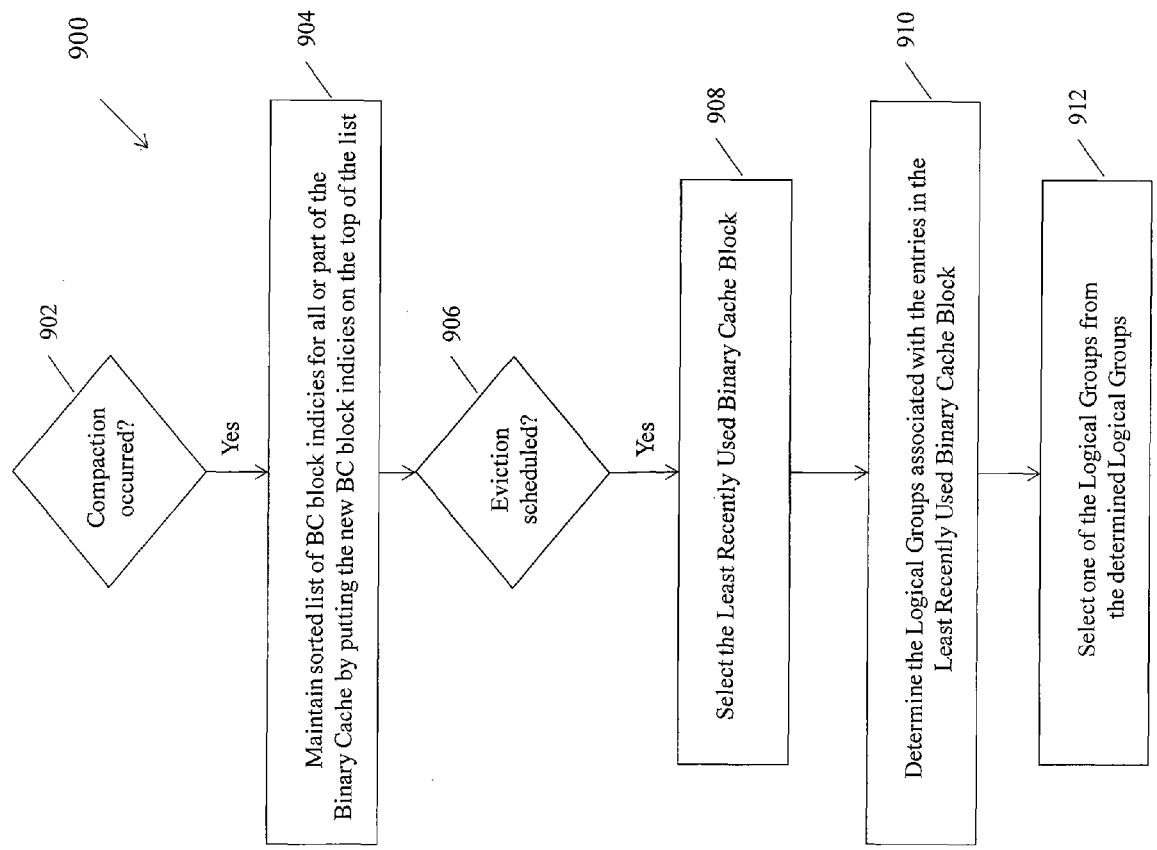
FIG. 9 is a flow diagram illustrating one type of cache eviction mechanism.

FIG. 9 illustrates one example of a flow chart 900 in which the storage device 12 analyzes the binary cache for at least one characteristic independent of any logical space indicator in order to determine which entries to evict. Execution of the mechanism in flow chart 900 in order to generate or update the analysis of the physical history of the cache (such as block 904, discussed below) may be triggered in several ways. One way is based on whether a compaction has occurred, as shown at block 902. Binary cache compaction is where one of the binary cache blocks has its valid contents (e.g., those which are referenced by valid BCI record) moved to a new binary cache block. The original binary cache block is marked for deletion, resulting in increased free space as only valid fragments will be moved. Alternatively, the updating of the physical history analysis of the binary cache may be performed periodically or when an eviction from binary cache is deemed necessary.

When the processor 20 determines that a compaction or another type of triggering event has occurred, the processor may update a sorted list for all or part of the binary cache, such as a sorted list of binary cache block indices for a binary cache zone or for the entire binary cache. For example, the processor 20 may analyze a physical aspect of the binary cache (such as the binary cache blocks or binary cache zones) for LRU, LFU, or another criterion. In the instance of LRU, the processor 20 may rearrange the binary cache block indices, such as put the new binary cache block indices on the top of the list, as shown at block 904.

When the processor 20 determines that an eviction from the binary cache is warranted (block 906), the processor 20 may access the physical history of the binary cache. For example, the processor 20 may access the sorted list in order to select the Least Recently Used binary cache block, as shown at block 908. And, the entries in the selected Least Recently Used binary cache block may be examined in order to determine the associated logical groups, as shown at block 910. Then, one of the determined logical groups may be selected for eviction, as shown at block 912. One way to determine the logical group selected for eviction may include randomly selecting one logical group from the set of logical groups that have entries in the Least Recently Used binary cache block. The entries associated with the selected logical group may be designated for eviction, including entries associated with the selected logical group in a part of the binary cache (such as a particular zone) or entries associated with the selected logical group in the entire binary cache.

Another type of cache eviction mechanism analyzes compaction history in order to determine which entries to evict from the binary cache. Compaction may be used as an indicator of age for one or more entries in the binary cache. For example, in one embodiment, the processor 20 may track a compaction count for one or more logical space indicators (such as one or more logical groups), with the compaction count being used as an indicator of old or resident logical groups that may be evicted from binary cache. Compaction count is merely one example of an indicator of compaction history. Other indicators of compaction history are contemplated.

Figure 10:
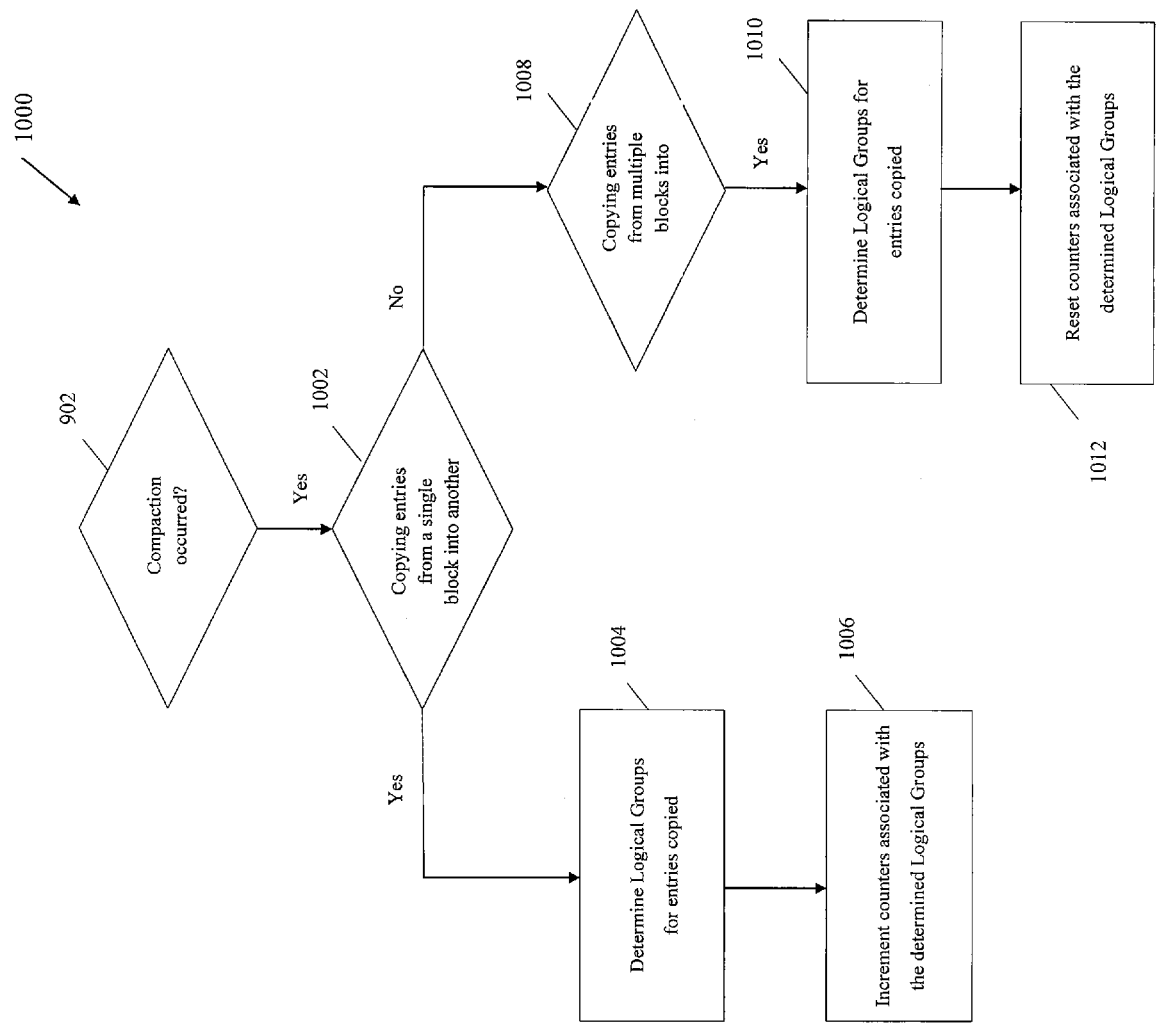
FIG. 10 is a flow diagram illustrating another type of cache eviction mechanism.

FIG. 10 illustrates one example of a flow chart 1000 in which the storage device 12 implements a cache eviction mechanism by analyzing at least one aspect of compaction. In one embodiment, the cache eviction mechanism analyzes compaction history. Execution of the cache eviction mechanism in flow chart 1000 in order to generate or update the compaction history may be triggered in several ways. One way is based on whether a compaction has occurred, as shown at block 902. If a compaction has occurred, it is determined whether entries are copied from a single binary cache block into another binary cache block, as shown at block 1002. If so, the logical groups associated with the copies entries are determined, as shown at block 1004. And, the compaction counters associated with the determined logical groups are incremented, as shown at block 1006. As discussed above, compaction indicators, other than compaction counters, may be used to indicate an amount of compaction for a particular logical group.

When the processor 20 determines that an eviction from the binary cache is warranted, the processor 20 may access the compaction indicators. For example, the processor 20 may analyze the compaction counters (or other compaction indicators) in order to determine which logical group (or logical groups) to evict. In one embodiment, the processor 20 may determine the logical group that has the most compactions in a particular section of the cache (such as a particular binary cache zone). In an alternative embodiment, the processor 20 may determine the logical group that has the most compactions in the entire binary cache. In still another embodiment, the processor 20 may first segment all of the logical groups that have a compaction count greater than a predetermined amount (such as greater than "N" times). And, the processor 20 may randomly select one logical group (or multiple logical groups) from the set of logical group that have compaction counts greater than "N" times. The entries associated with the selected logical group may be designated for eviction, including entries associated with the selected logical group in a part of the binary cache (such as a particular zone) or entries associated with the selected logical group in the entire binary cache.

If the entries are not copied from a single binary cache block into another binary cache block, it is determined whether the entries are copied from multiple binary cache blocks into another binary cache block, as shown at block 1008. If so, the logical groups associated with the copies entries are determined, as shown at block 1010. And, the compaction counters associated with the determined logical groups are reset, as shown at block 1012. The flow chart 1000 may continue to loop at block 902 until a compaction occurs.

Still another type of eviction mechanism analyzes less than all of the binary cache entries associated with one or more logical space indicators (such as one or more logical groups) for a particular criterion, and based on the analysis, selects one or more logical space indicators for eviction from the binary cache.

One type of the criterion for the analysis may include age. For example, the eviction mechanism may determine the logical group with the oldest "entry". In one embodiment, the eviction mechanism analyzes the entire binary cache for the oldest fragment. In an alternative embodiment, the eviction mechanism analyzes less than all of the binary cache (such as one zone of the binary cache) for the oldest fragment in the analyzed part of the binary cache (such as in the one zone of the binary cache). The eviction mechanism may determine the oldest fragment in several ways. For example, the eviction mechanism may use the binary cache index to track time stamps of the first fragment write for the logical groups that have entries in the binary cache. As another example, the eviction mechanism may use a table (or other data structure) that lists the time stamps for the oldest fragment associated with the logical group. The table of time stamps may be generated from the binary cache index. One, some, or all of the entries associated with the logical group having the oldest entry may then be evicted from the binary cache.

In this way, the cache eviction mechanism analyzes only a part of the entries for a logical group, such as the oldest fragment in a logical group, in order to determine whether to select the logical group for eviction. The cache eviction mechanism may then select the logical group with the oldest fragment, and evict some or all other entries in the binary cache that are in the selected logical group. This is unlike other cache eviction algorithms that determine the characteristic of the entire logical group (such as the number of fragments in the logical group) when determining whether to select the logical group for eviction. Thus, the eviction of entries that have the same logical space indicator may be done without analysis of the evicted entries. More specifically, only a subset of the entries for a logical group is analyzed (such as only the oldest fragment for a logical group), and other entries that have the same logical space indicator may be designated for eviction from the binary cache.

Figure 11:
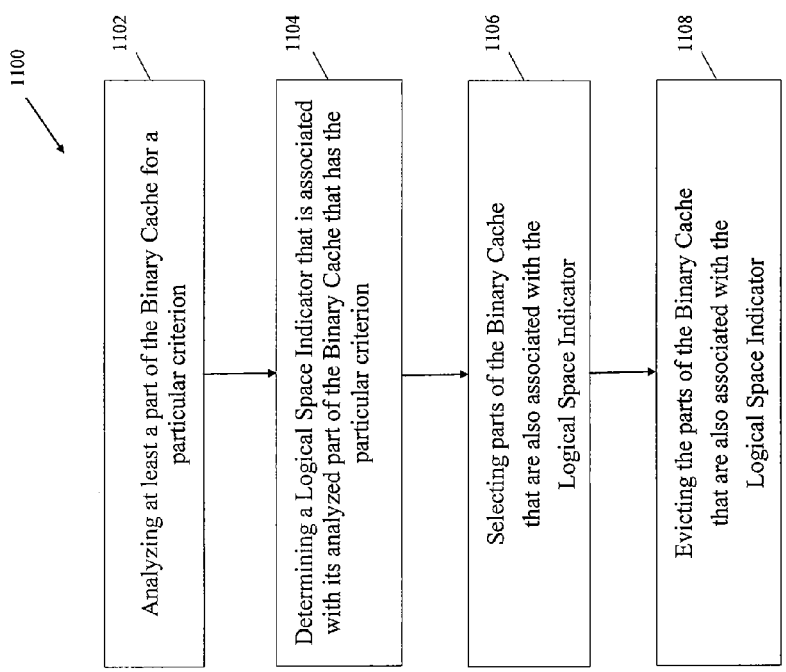
FIG. 11 is a flow diagram illustrating yet another type of cache eviction mechanism.

FIG. 11 illustrates one example of a flow chart 1100 in which the storage device 12 implements another cache eviction mechanism. At least a part of the binary cache is analyzed for a certain criterion, as shown at block 1102. One criterion for analysis may be least recently fragmented (LRF). Another criterion may be least frequently fragmented.

For example, the binary cache may include fragments from different logical groups. As part of its analysis of the binary cache for fragmentation, the processor 20 may maintain one or more tables (or other data structure) to indicate the first write fragment for one, some or all of the logical groups that have fragments in the binary cache. A first example may include a single table that has a listing of the logical groups with fragments in the binary caches and a corresponding entry of a time stamp for the first write fragment for each of the logical groups listed. A second example includes two tables, in which the first table lists all of the fragments in at least a part of the binary cache (such as in a binary cache zone or in the entire binary cache) and the associated write fragment time stamps, and in which the second table lists the fragments in the binary cache and the associated logical group.

The processor 20 may determine the logical space indicator (such as the logical group) that has the particular criterion, as shown at block 1104. For example, the processor 20 may analyze the one or more tables to determine which logical group has the least recently fragmented entry in the binary cache. The processor 20 may then select one, some, or all of the entries in the binary cache that are associated with the determined logical space indicator, as shown at block 1106. For example, the processor 20 may determine the entries in the binary cache that are in the logical group with the least recently fragmented entry, and schedule those entries for eviction.

Still another type of cache eviction mechanism randomly selects the logical space indicator for eviction (such as randomly selecting the logical group for eviction). In one embodiment, the cache eviction mechanism may access some or all of the logical groups that have entries in the entire binary cache. In an alternative embodiment, the cache eviction mechanism may access some or all of the logical groups that have entries in less than the entire binary cache (such as in one binary cache zone). The cache eviction may then randomly select one logical group (or multiple logical groups) from the set of logical groups. For example, in one embodiment, the cache eviction mechanism may determine the set of logical groups that have entries in the entire binary cache. The cache eviction mechanism may select a subset to the set of logical groups that have entries in the entire binary cache (such as one logical group or multiple logical groups). As another example, in an alternative embodiment, the cache eviction mechanism may determine the set of logical groups that have entries in a particular binary cache zone. The cache eviction mechanism may select a subset to the set of logical groups that have entries in the particular binary cache zone (such as one logical group or multiple logical groups). The cache eviction algorithm may then determine the entries in the binary cache that are associated with the selected logical group, and may evict some or all of the determined entries from the binary cache.

One type of scheduling mechanism is disclosed that schedules multiple eviction mechanisms during a same phase of operation of the storage device. The storage device may operate in different phases, such as during a host operation (e.g., communicating with a host computer) or during an idle operation (e.g., not communicating with a host computer). In one embodiment, the multiple eviction mechanisms may operate at least partly during one or more phases of operation of the storage device. For example, the schedule may alternate the eviction mechanisms during a phase of operation of the storage device (such as alternating between two different eviction mechanisms during a host operation phase and/or an idle operation phase). Further, a ratio of use of the eviction methods may vary depending on the phase of operation of the storage device. For example, a first eviction mechanism may be more computationally intensive than a second eviction mechanism. Both the first eviction mechanism and the second eviction mechanism may be used during one or more phases of operation of the storage device. A ratio of use of the first eviction mechanism versus the second eviction mechanism may depend on whether the storage device is in a host operation or in an idle operation. One example of a ratio for two eviction mechanisms may be 70/30, in which for every 10 times that an eviction mechanism is used during a particular phase of operation, the first eviction mechanism is operated 7 times and the second eviction mechanism is operated 3 times. Specifically, during a host operation, the controller of the storage device may have less available processing capability, so that the first eviction mechanism (being more computationally intensive) is used less than the second eviction mechanism. Moreover, during an idle operation, the controller of the storage device may have more available processing capability, so that the first eviction mechanism (being more computationally intensive) is used more than the second eviction mechanism.

Another type of scheduling mechanism selects the eviction mechanism based on indication of utilization of the binary cache storage. In one embodiment, the indication of utilization is an amount of data in binary cache. In an alternate embodiment, the indication of utilization is based on an amount to be evicted from binary cache. The indication of utilization of the binary cache may be compared to one or more thresholds. The one or more thresholds may be indicative of an amount of data (such as a percentage of fullness of binary cache or a number of Megabytes (MB) stored in binary cache). The comparison may determine which eviction mechanism is selected. For example, a first threshold may be 80% (indicative of the binary cache being 80% utilized) and a second threshold may be 60% (indicative of the binary cache being 60% utilized). Alternatively, the first threshold may be 90%. The listed thresholds are merely for illustration purposes. Other thresholds may be used.

In one embodiment, the amount of data in the binary cache may be compared to one or more thresholds. If the amount of data in binary cache is greater than the first threshold, a first eviction mechanism is selected. If the amount of data in binary cache is less than the first threshold but greater than the second threshold, a second eviction mechanism is selected. In an alternate embodiment, the amount of data sought to be removed from binary cache may be compared to one or more thresholds. The one or more thresholds may be indicative of an amount of data for removal (such as a percentage of data to remove from binary cache or a number of megabytes to remove from binary cache).

Still another type of scheduling mechanism selects the eviction mechanism based on an amount of data in binary cache or based on an amount to be evicted from binary cache (e.g., based on an amount of utilization of the binary cache).

Yet another type of scheduling mechanism determines the number of times eviction mechanisms are used during one phase of operation based on the number of times the same (or a different) mechanism is used during another phase of operation. In one embodiment, the processor 20 tracks a number of times an eviction mechanism is used in a first phase of operation (such as during host operation). One example of an eviction mechanism during a host operation is referenced in the Background section (i.e., the selecting logical group with the highest number of fragments in the binary cache (BC) for eviction). The processor 20 may track the number of times the eviction mechanism is used during the host operation. In one embodiment, the eviction mechanism selects a particular logical group for eviction every time the eviction mechanism is executed (i.e., "N" times of execution of a first eviction mechanism during a first phase of operation results in "N" times of execution of a second eviction mechanism during a second phase of operation). So that, operating the eviction mechanism 10 times results in 10 logical groups being evicted. When the storage device enters a second phase of operation (such as an idle operation), the processor 20 may execute an eviction mechanism (such as one different from the eviction mechanism executed during the first phase of operation) based on the number of execution of the eviction mechanisms during the first phase of operation. In one embodiment, the processor 20 may execute the eviction mechanisms in the second phase of operation the same amount of times that the eviction mechanisms were operated in the first phase of operation. In the example given, if the eviction mechanism was operated 10 times (so that the logical group with the highest number of fragments in the binary cache was selected for eviction 10 times, with the effect that the 10 logical groups with the 10 highest number of fragments are selected for eviction), a corresponding number of times that a different eviction mechanism may be operated. If during the idle operation, more evictions are necessary, the processor 20 may switch to a different eviction mechanism after the selected eviction mechanism has been operated "N" times. For example, the processor 20 may execute one of the eviction mechanisms include those referenced in FIGS. 9-11 10 times (so that 10 logical groups are selected for eviction). If the processor 20 determines that more logical groups need to be selected for eviction, after the processor executes the eviction mechanism "N" times (such as 10 times), the processor 20 selects a different eviction mechanism (such as selecting the logical group with the number of fragments that exceeds a calculated threshold, as discussed in the background). As discussed above, the "N" number of times an eviction mechanism is counted is performed during the host operation. In an alternative embodiment, the processor 20 may count the number of times ("N" times) an eviction mechanism is performed during an idle operation (thereby limiting the execution of a different eviction mechanism during a host operation to "N" times).

Figure 12:
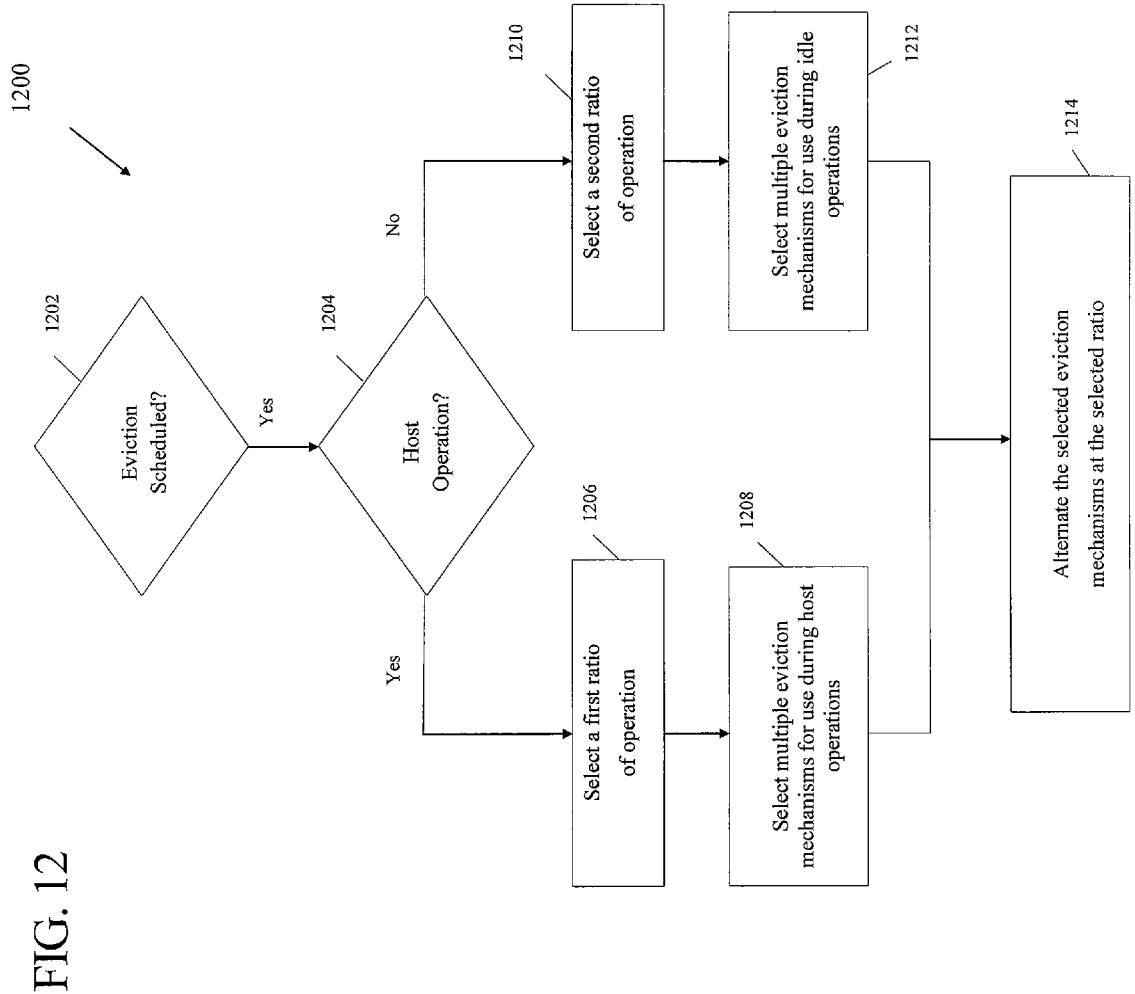
FIG. 12 is a flow diagram illustrating one type of scheduling of cache eviction mechanisms.

FIG. 12 illustrates one example of a flow chart 1200 for scheduling eviction mechanisms. As shown at block 1202, it is determined whether an eviction is scheduled. If so, the phase of operation of the storage device is determined. In one embodiment, it is determined whether a host operation is occurring, as shown at block 1204. In an alternate embodiment, it is determined whether an idle operation is occurring. If a host operation is occurring, a first ratio is selected, as shown at block 1206. During the host operation, the processor 20 may have less processing capability available. Further, certain eviction mechanisms may consume more processing capability than other eviction mechanisms. In selecting the ratio of eviction mechanisms during a host operation, the emphasis may be on eviction mechanisms that use less processing capability. Further, multiple eviction mechanisms are selected, as shown at block 1208.

One example of an eviction mechanism is disclosed in the Background section in which the logical group with the highest number of fragments in the binary cache during a host operation is evicted and in which the logical group with the number of fragments exceeding a calculated threshold during idle time is evicted. Other examples of eviction mechanisms include those referenced in FIGS. 9-11. Still another example of a cache eviction mechanism is one that randomly selects the logical space indicator for eviction (such as randomly selecting the logical group for eviction). The multiple eviction mechanisms selected may include the eviction mechanism referenced in the Background section, and one (or more) of the eviction mechanisms referenced in FIGS. 9-11 or the random eviction mechanism.

An example of the first ratio is 70/30 whereby the alternation may be such that 70% of the time, the eviction mechanism referenced in the Background section is used and 30% of the time, the second eviction mechanism (selected from the eviction mechanisms referenced in FIGS. 9-11 or the random eviction mechanism) may be used. Because the eviction mechanism referenced in the Background section uses less processor resources, it may be used more often during the host operation. And, the selected eviction mechanisms are alternated at the selected ratio, as shown at block 1214. As discussed above, with a 70/30 ratio, for every 10 times eviction mechanisms are operated during a host operation, the eviction mechanism that selects the logical group with the highest number of fragments in the binary cache (discussed in the Background) may be used 7 times and one of the eviction mechanisms referenced in FIGS. 9-11 or the random eviction mechanism may be used 3 times.

If a host operation is not being performed, a second ratio is selected, as shown at block 1210. During idle operation, the processor 20 may have more processing capability available. In selecting the ratio of eviction mechanisms during an idle operation, the emphasis may be on eviction mechanisms that use more processing capability. Further, multiple eviction mechanisms are selected, as shown at block 1212.

An example of the second ratio is 30/70 whereby the alternation may be such that 30% of the time, the eviction mechanism referenced in the Background section is used and 70% of the time, the second eviction mechanism (selected from the eviction mechanisms referenced in FIGS. 9-11 or the random eviction mechanism) may be used. With a 30/70 ratio, for every 10 times eviction mechanisms are operated during an idle operation, the eviction mechanism that selects the logical group with the number of fragments exceeding a calculated threshold (discussed in the Background) may be used 3 times and one of the eviction mechanisms referenced in FIGS. 9-11 or the random eviction mechanism may be used 7 times.

Figure 13:
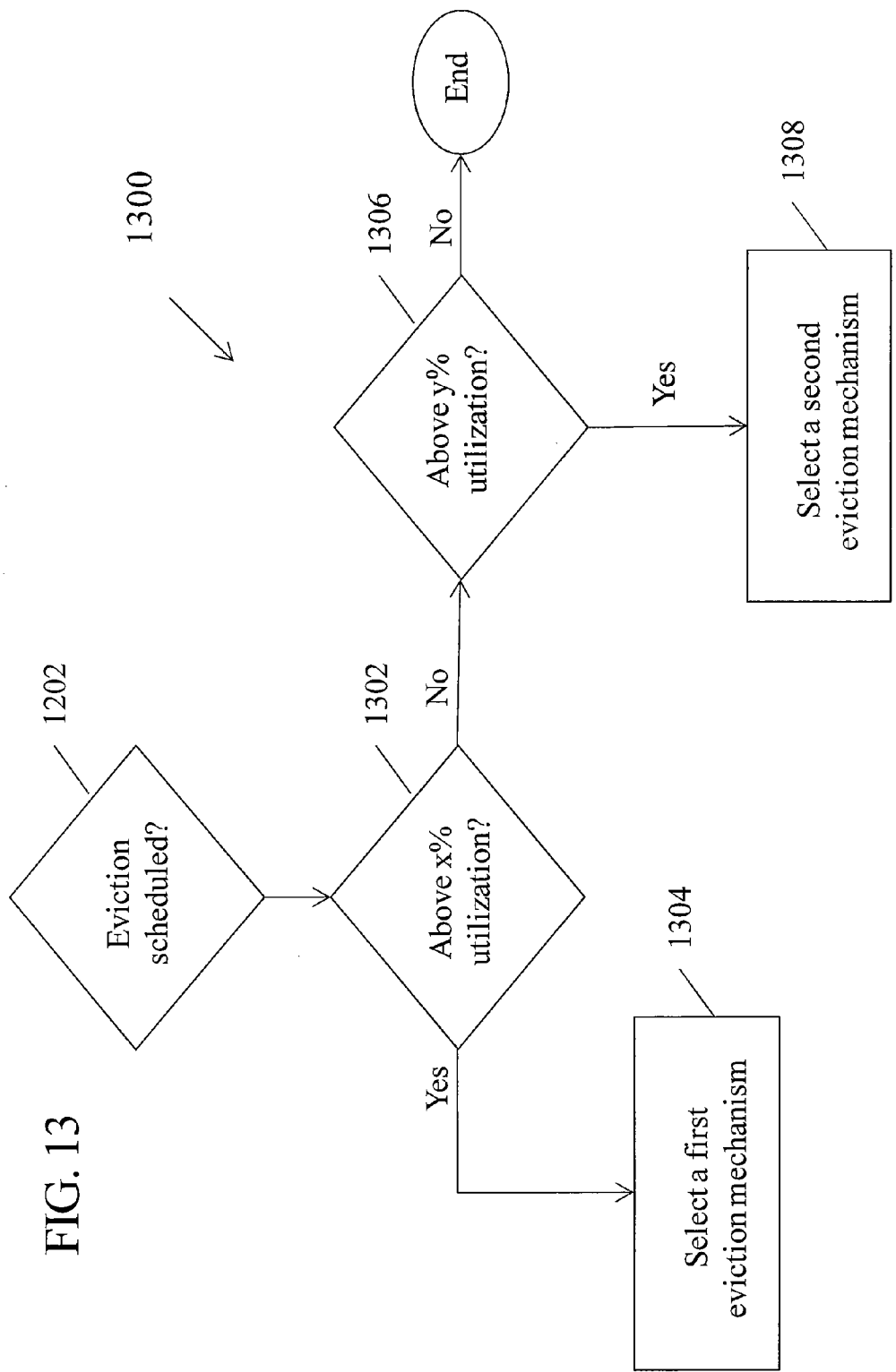
FIG. 13 is a flow diagram illustrating another type of scheduling of cache eviction mechanisms.

FIG. 13 illustrates another example of a flow chart 1300 for scheduling eviction mechanisms. As shown at block 1202, it is determined whether an eviction is scheduled. Further, the binary cache is analyzed to determine an indication of utilization of the binary cache. There are multiple types of indications of utilization. One example is an amount of the binary cache that is utilized (such as a percentage of utilization of the binary cache). Still another example is an amount of the binary cache that is unutilized (such as a percentage of the binary cache that is unutilized). In FIG. 13, the indication of utilization comprises a utilization percentage. For example, the utilization percentage is compared with a x % utilization, as shown at block 1302. x % may be approximately 80% to approximately 90%. More specifically, the eviction mechanism may determine the phase of operation (such as whether the storage device is in a host operation). If the storage device is in a host operation, the eviction mechanism may check the percentage of utilization. If the utilization percentage is greater than x %, a first eviction mechanism is selected, as shown at block 1304. One type of first eviction mechanism that may be selected if the utilization percentage is greater than 80% is the eviction mechanism referenced in the Background section (e.g., in a host operation, selecting the logical group with the highest number of fragments in the binary cache). If the utilization percentage is less than x %, it is determined whether the utilization percentage is greater than y %. y % may be approximately 60%. If the utilization percentage is greater than y %, then the second eviction mechanism is selected, as shown at block 1308. The second eviction mechanism may be selected from the eviction mechanisms referenced in FIGS. 9-11 or the random eviction mechanism. If the utilization percentage is less than or equal to y %, then no eviction mechanism need be selected and the eviction mechanism ends (as shown in FIG. 13).

Though FIG. 13 is not specific to a phase of operation of the storage device, the methodology disclosed in FIG. 13 may be performed in one or both phases of operation of the storage device. For example, the methodology disclosed in FIG. 13 may only be performed during a host operation, only be performed during an idle operation, or be performed during a host operation and an idle operation.

Figure 14:
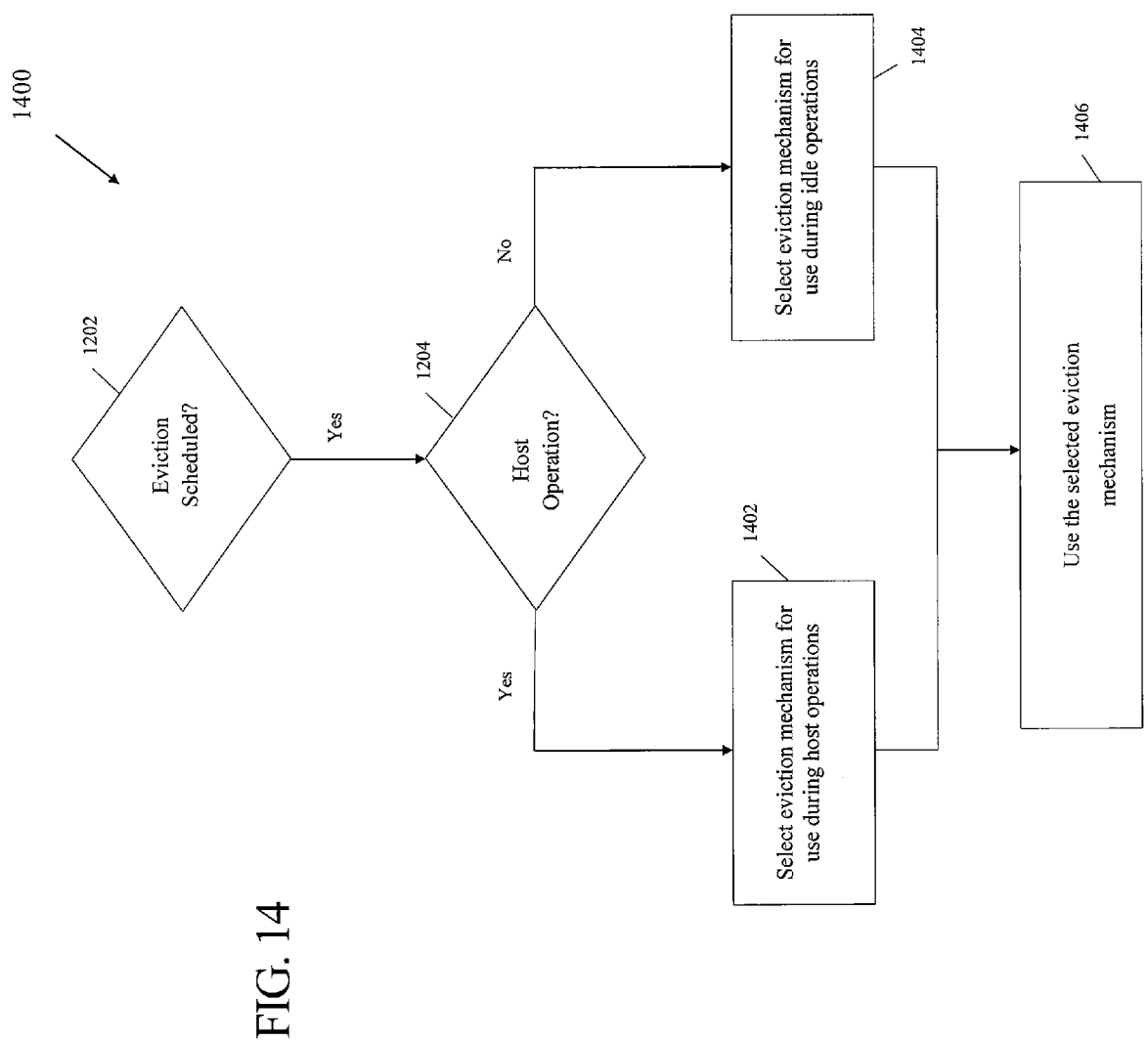
FIG. 14 is a flow diagram illustrating yet another type of scheduling of cache eviction mechanisms.

FIG. 14 illustrates yet another example of a flow chart 1400 for scheduling eviction mechanisms. As shown at block 1202, it is determined whether an eviction is scheduled. If so, the phase of operation of the storage device is determined. It is determined whether a host operation is occurring, as shown at block 1204. If so, an eviction mechanism for use during host operations is selected, as shown at block 1402. One type of eviction mechanism for use during host operations is the eviction mechanism referenced in the Background section. If not, an eviction mechanism for use during idle operations is selected, as shown at block 1404. Eviction mechanisms for use during idle operations include the eviction mechanisms referenced in FIGS. 9-11 or the random eviction mechanism. The selected eviction mechanism is then used, as shown at block 1406.

In another embodiment, a method of evicting data from a cache storage to a main storage in a storage device is disclosed. The method comprises: analyzing at least a part of the cache storage for a predetermined characteristic independent of any logical space indicator; selecting at least one logical space indicator based on the analysis; and evicting at least some of the data in the cache storage that is associated with the selected at least one logical space indicator. The at least a part of the cache storage may be divided into a plurality of cache blocks, and analyzing at least a part of the cache storage for a predetermined characteristic independent of any logical space indicator may comprises: analyzing the plurality of cache blocks for the predetermined characteristic; and selecting one of the plurality of cache blocks. Further, the logical space indicator may comprise a logical group. Moreover, the selected one of the plurality of cache blocks may include data associated with multiple logical groups, and wherein selecting at least one logical space indicator based on the analysis comprises selecting a logical group from the multiple logical groups. In addition, selecting a logical group from the multiple logical groups may comprise randomly selecting the logical group from the multiple logical groups. The predetermined characteristic in the method may comprise least recently used, and analyzing for a predetermined characteristic at least a part of the cache storage independent of any logical space indicator may comprise selecting a least recently used logical block in the at least a part of the cache storage. The cache storage may be divided into a plurality of zones, and selecting a least recently used logical block in the at least a part of the cache storage may comprise selecting the least recently used logical block in one of the plurality of zones.

In still another embodiment, a method of evicting data from a cache storage to a main storage in a storage device is disclosed. The method comprises: determining an indication of utilization of the cache storage; selecting at least one cache eviction mechanisms in response to determining the indication of utilization of the cache storage; and evicting at least some of the data in the cache storage based on the selected at least one cache eviction mechanism. Determining an indication of utilization of the cache storage may comprise determining a percentage of utilization of the cache storage. Determining an indication of utilization of the cache storage may comprise determining an amount of the cache storage that is unutilized. Selecting at least one cache eviction mechanisms in response to determining the amount of utilization of the cache storage may comprise comparing the indication of utilization with a predetermined indication. The indication of utilization may comprise a percentage of utilization, and the percentage of utilization may be compared with at least one predetermined percentage. Selecting at least one cache eviction mechanisms in response to determining the indication of utilization of the cache storage may comprise: selecting a first cache eviction mechanism if the percentage of utilization is greater than the at least one predetermined percentage; and selecting a second cache eviction mechanism if the percentage of utilization is less than the at least one predetermined percentage. The at least one predetermined percentage may comprise a first percentage and a second percentage, and selecting at least one cache eviction mechanisms in response to determining the indication of utilization of the cache storage may comprise: selecting the first cache eviction mechanism if the percentage of utilization is greater than the first percentage; selecting the second cache eviction mechanism if the percentage of utilization is less than the first percentage and greater than the second percentage; and not selecting any cache eviction mechanism if the percentage of utilization is less than the second percentage.

In other aspects of the invention, a processor readable medium is disclosed having processor executable instructions for carrying out the above-described methods.

In yet another embodiment, a storage device is disclosed. The storage device comprises: a cache storage configured for receiving data associated with host write commands; a main storage in communication with the cache storage and configured to receive data transferred from the cache storage; and a controller configured to: analyze at least a part of the cache storage for a predetermined characteristic independent of any logical space indicator; select at least one logical space indicator based on the analysis; and evict at least some of the data in the cache storage that is associated with the selected at least one logical space indicator. The at least a part of the cache storage may be divided into a plurality of cache blocks, and the controller is configured to analyze at least a part of the cache storage for a predetermined characteristic independent of any logical space indicator by: analyzing the plurality of cache blocks for the predetermined characteristic; and selecting one of the plurality of cache blocks. The logical space indicator may comprise a logical group. The selected one of the plurality of cache blocks may include data associated with multiple logical groups, and the controller may be configured to select at least one logical space indicator based on the analysis by selecting a logical group from the multiple logical groups. The controller may further be configured to select a logical group from the multiple logical groups by randomly selecting the logical group from the multiple logical groups. The predetermined characteristic may comprise least recently used, and the controller may be configured to analyze for a predetermined characteristic at least a part of the cache storage independent of any logical space indicator by selecting a least recently used logical block in the at least a part of the cache storage. The cache storage may be divided into a plurality of zones, and the controller may be configured to select a least recently used logical block in the at least a part of the cache storage by selecting the least recently used logical block in one of the plurality of zones.

In still another embodiment, a storage device is disclosed. The storage device comprises: a cache storage configured for receiving data associated with host write commands; a main storage in communication with the cache storage and configured to receive data transferred from the cache storage; and a controller configured to: determine an indication of utilization of the cache storage; select at least one cache eviction mechanisms in response to determining the indication of utilization of the cache storage; and evict at least some of the data in the cache storage based on the selected at least one cache eviction mechanism. The controller may be configured to determine an indication of utilization of the cache storage by determining a percentage of utilization of the cache storage. Or, the controller may be configured to determine an indication of utilization of the cache storage by determining an amount of the cache storage that is unutilized. Moreover, the controller may be configured to select at least one cache eviction mechanisms in response to determining the amount of utilization of the cache storage by comparing the indication of utilization with a predetermined indication. The indication of utilization may comprise a percentage of utilization, and the controller may be configured to compare the percentage of utilization with at least one predetermined percentage. In addition, the controller may be configured to select at least one cache eviction mechanisms in response to determining the indication of utilization of the cache storage by: selecting a first cache eviction mechanism if the percentage of utilization is greater than the at least one predetermined percentage; and selecting a second cache eviction mechanism if the percentage of utilization is less than the at least one predetermined percentage. Also, the at least one predetermined percentage may comprise a first percentage and a second percentage, and the controller may be configured to select at least one cache eviction mechanisms in response to determining the indication of utilization of the cache storage by: selecting the first cache eviction mechanism if the percentage of utilization is greater than the first percentage; selecting the second cache eviction mechanism if the percentage of utilization is less than the first percentage and greater than the second percentage; and not selecting any cache eviction mechanism if the percentage of utilization is less than the second percentage.

In yet still another embodiment, a storage device is disclosed. The storage device comprises: a cache storage configured for receiving data associated with host write commands; a main storage in communication with the cache storage and configured to receive data transferred from the cache storage; and a controller configured to: determine a first number of times a first eviction mechanism is performed during a first phase of operation of the storage device; execute a second eviction mechanism for a second number of times during a second phase of operation of the storage device, the first eviction method being different from the second eviction method, the first phase of operation of the storage device being different from the second phase of operation of the storage device, the second number of times being selected based on the first number of times; and after the second eviction mechanism is executed for the second number of times during the second phase of operation of the storage device, select a third eviction mechanism for operation during the second phase of operation of the storage device. The first phase of operation may comprise a host operation, and the second phase of operation may comprise an idle operation. Moreover, the first number of times may equal the second number of times.

It is intended that the foregoing detailed description be understood as an illustration of selected forms that the invention can take and not as a definition of the invention. It is only the following claims, including all equivalents, that are intended to define the scope of this invention.

We claim:

1. A method of cleaning a cache storage in a storage device using a first cache cleaning mechanism and a second cache cleaning mechanism, the method comprising: determining whether to clean at least a part of the cache storage; accessing a rule to determine which of the first cache cleaning mechanism or the second cache cleaning mechanism to use during at least a part of a phase of operation of the storage device, application of the rule resulting in use of both the first cache cleaning mechanism and the second cache cleaning mechanism during the phase of operation of the storage device, and being based on multiple prior uses of both the first cache cleaning mechanism and the second cache cleaning mechanism; applying the accessed rule, based on the multiple prior uses of both the first cache cleaning mechanism and the second cache cleaning mechanism, in order to determine whether to select another of the first cache cleaning mechanism or the second cache cleaning mechanism to clean the cache storage; and in response to determining to use the first cache cleaning mechanism, using the first cache cleaning mechanism to clean the cache storage during the phase of operation of the storage device.

2. The method of claim 1, wherein the phase of operation of the storage device is selected from the group consisting of host operation and idle operation.

3. The method of claim 2, wherein the first cache cleaning mechanism comprises a first cache eviction mechanism;
wherein the second cache cleaning mechanism comprises a second cache eviction mechanism; and
wherein the accessed rule comprises alternating selection of the first cache eviction mechanism and the second cache eviction mechanism for use.

4. The method of claim 1,
wherein applying the accessed rule in order to determine whether to use the first cache cleaning mechanism or the second cache cleaning mechanism comprises determining to use the first cache cleaning mechanism in order to satisfy a ratio of use between the first cache cleaning mechanism and the second cache cleaning mechanism during the at least a part of the phase of operation of the storage device.

5. The method of claim 4, wherein the phase of operation of the storage device comprises one phase of operation;
wherein the storage device operates in the one phase of operation and another phase of operation; and
wherein the ratio of use between the first cache cleaning mechanism and the second cache cleaning mechanism during the one phase of operation of the storage device is different from a ratio of use between the first cache cleaning mechanism and the second cache cleaning mechanism during the another phase of operation of the storage device.

6. The method of claim 1, wherein applying the accessed rule in order to determine whether to use the first cache cleaning mechanism or the second cache cleaning mechanism comprises analyzing a number of times the first cache cleaning mechanism has been used in at least a part of the phase of operation.

7. The method of claim 6, wherein analyzing the number of times the first cache cleaning mechanism has been used in the at least a part of the phase of operation comprises comparing the number of times the first cache cleaning mechanism was used in the phase of operation with a number of times the first cache cleaning mechanism was used in at least a part of a different phase of operation of the storage device.

8. The method of claim 1, wherein applying the accessed rule in order to determine whether to use the first cache cleaning mechanism or the second cache cleaning mechanism comprises comparing a number of times the first cache cleaning mechanism has been used in at least a part of the phase of operation with a number of times a different cache cleaning mechanism has been used in at least a part of a different phase of operation of the storage device.

9. The method of claim 1, wherein applying the accessed rule in order to determine whether to use the first cache cleaning mechanism or the second cache cleaning mechanism to clean the cache storage comprises:
accessing a number of times a first cleaning mechanism has been used;
accessing a number of times a second cleaning mechanism has been used;
determining whether to clean the cache storage using the first cleaning mechanism or using the second cleaning mechanism based on the number of times the first cleaning mechanism has been used and on the number of times the second cleaning mechanism has been used.

10. The method of claim 1, wherein applying the accessed rule in order to determine whether to use the first cache cleaning mechanism or the second cache cleaning mechanism to clean the cache storage comprises:
selecting from a plurality of available cache cleaning mechanisms, the selection based on the number of times a respective available cache cleaning mechanism has previously been used during the at least a part of the phase of operation.

11. The method of claim 1, wherein the first cache cleaning mechanism comprises a first cache eviction mechanism; and
wherein the second cache cleaning mechanism comprises a second cache eviction mechanism.

12. A storage device comprising: a cache storage configured to receive data associated with host write commands; a main storage in communication with the cache storage and configured to receive data transferred from the cache storage; and a controller configured to: determine whether to clean at least a part of the cache storage; access a rule to determine which of the first cache cleaning mechanism or the second cache cleaning mechanism to use during at least a part of a phase of operation of the storage device, application of the rule resulting in use of both the first cache cleaning mechanism and the second cache cleaning mechanism during the phase of operation of the storage device, and being based on multiple prior uses of both the first cache cleaning mechanism and the second cache cleaning mechanism; apply the accessed rule, based on the multiple prior uses of both the first cache cleaning mechanism and the second cache cleaning mechanism, in order to determine whether to select another of the first cache cleaning mechanism or the second cache cleaning mechanism to clean the cache storage; and in response to determining to use the first cache cleaning mechanism, use the first cache cleaning mechanism to clean the cache storage during the phase of operation of the storage device.

13. The storage device of claim 12, wherein the phase of operation of the storage device is selected from the group consisting of host operation and idle operation.

14. The storage device of claim 13, wherein the first cache cleaning mechanism comprises a first cache eviction mechanism;
wherein the second cache cleaning mechanism comprises a second cache eviction mechanism; and
wherein the accessed rule comprises alternatingly selection of the first cache eviction mechanism and the second cache eviction mechanism during the at least a part of the phase of operation of the storage device.

15. The storage device of claim 12,
wherein the controller is configured to apply the accessed rule in order to determine whether to use the first cache cleaning mechanism or the second cache cleaning mechanism by determining to use the first cache cleaning mechanism in order to satisfy a ratio of use between the first cache cleaning mechanism and the second cache cleaning mechanism during the at least a part of the phase of operation of the storage device.

16. The storage device of claim 15, wherein the phase of operation of the storage device comprises one phase of operation;
wherein the storage device operates in the one phase of operation and another phase of operation; and
wherein the ratio of use between the first cache cleaning mechanism and the second cache cleaning mechanism during the one phase of operation of the storage device is different from a ratio of use between the first cache cleaning mechanism and the second cache cleaning mechanism during the another phase of operation of the storage device.

17. The storage device of claim 12, wherein the controller is configured to apply the accessed rule in order to determine whether to use the first cache cleaning mechanism or the second cache cleaning mechanism by analyzing a number of times the first cache cleaning mechanism has been used in at least a part of the phase of operation.

18. The storage device of claim 17, wherein the controller is analyze the number of times the first cache cleaning mechanism has been used in the at least a part of the phase of operation by comparing the number of times the first cache cleaning mechanism was used in the phase of operation with a number of times the first cache cleaning mechanism was used in at least a part of a different phase of operation of the storage device.

19. The storage device of claim 12, wherein the controller is configured to apply the accessed rule in order to determine whether to use the first cache cleaning mechanism or the second cache cleaning mechanism by comparing a number of times the first cache cleaning mechanism has been used in at least a part of the phase of operation with a number of times a different cache cleaning mechanism has been used in at least a part of a different phase of operation of the storage device.

20. The storage device of claim 12, wherein the controller is configured to apply the accessed rule in order to determine whether to use the first cache cleaning mechanism or the second cache cleaning mechanism to clean the cache storage by:
    accessing a number of times a first cleaning mechanism has been used;
    accessing a number of times a second cleaning mechanism has been used;
    determining whether to clean the cache storage using the first cleaning mechanism or using the second cleaning mechanism based on the number of times the first cleaning mechanism has been used and on the number of times the second cleaning mechanism has been used.

21. The storage device of claim 12, wherein the controller is configured to apply the accessed rule in order to determine whether to use the first cache cleaning mechanism or the second cache cleaning mechanism to clean the cache storage by:
    selecting from a plurality of available cache cleaning mechanisms, the selection based on the number of times a respective available cache cleaning mechanism has previously been used during the at least a part of the phase of operation.

22. The storage device of claim 12, wherein the first cache cleaning mechanism comprises a first cache eviction mechanism; and
    wherein the second cache cleaning mechanism comprises a second cache eviction mechanism.

23. A method of cleaning a cache storage to a main storage in a storage device comprising:
    determining whether to clean the cache storage;
    accessing a non-zero number of times a first cache cleaning mechanism has been used during at least a part of a phase of operation of the storage device;
    accessing a non-zero number of times a second cache cleaning mechanism has been used during at least a part of a phase of operation of the storage device;
    determining whether to use the first cache cleaning mechanism or the second cache cleaning mechanism to clean the cache storage based on both the non-zero number of times the first cache cleaning mechanism and the non-zero number of times the second cache cleaning mechanism has previously been used in the at least a part of the phase of operation;
    in response to determining to use the first cache cleaning mechanism, using the first cache cleaning mechanism to clean the cache storage during the phase of operation of the storage device; and
    in response to determining to use the second cache cleaning mechanism, using the second cache cleaning mechanism to clean the cache storage during the phase of operation of the storage device.

24. The method of claim 23, wherein the first cache cleaning mechanism comprises a first cache eviction mechanism; and
    wherein the second cache cleaning mechanism comprises a second cache eviction mechanism.

25. A storage device comprising:
    a cache storage configured to receive data associated with host write commands;
    a main storage in communication with the cache storage and configured to receive data transferred from the cache storage; and
    a controller configured to:
        determine whether to clean the cache storage;
        access a non-zero number of times a first cache cleaning mechanism has been used during at least a part of a phase of operation of the storage device;
        access a non-zero number of times a second cache cleaning mechanism has been used during at least a part of a phase of operation of the storage device;
        determine whether to use the first cache cleaning mechanism or the second cache cleaning mechanism to clean the cache storage based on both the non-zero number of times the first cache cleaning mechanism and the non-zero number of times the second cache cleaning mechanism has previously been used in the at least a part of the phase of operation;
        in response to determining to use the first cache cleaning mechanism, use the first cache cleaning mechanism to clean the cache storage during the phase of operation of the storage device; and
        in response to determining to use the second cache cleaning mechanism, use the second cache cleaning mechanism to clean the cache storage during the phase of operation of the storage device.

26. The storage device of claim 25, wherein the first cache cleaning mechanism comprises a first cache eviction mechanism; and
    wherein the second cache cleaning mechanism comprises a second cache eviction mechanism.

27. The storage device of claim 25, wherein the controller is configured to determine whether to use the first cache cleaning mechanism or the second cache cleaning mechanism to clean the cache storage based on a ratio of use, as determined by the non-zero number of times the first cache cleaning mechanism and the non-zero number of times the second cache cleaning mechanism has previously been used in the at least a part of the phase of operation, of the first cache cleaning mechanism relative to the second cache cleaning mechanism.

28. The storage device of claim 27, wherein the ratio of use of the first cache cleaning mechanism relative to the second cache cleaning mechanism is other than 50/50.

* * * * *